No. 755,498. Patented March 22, 1904.

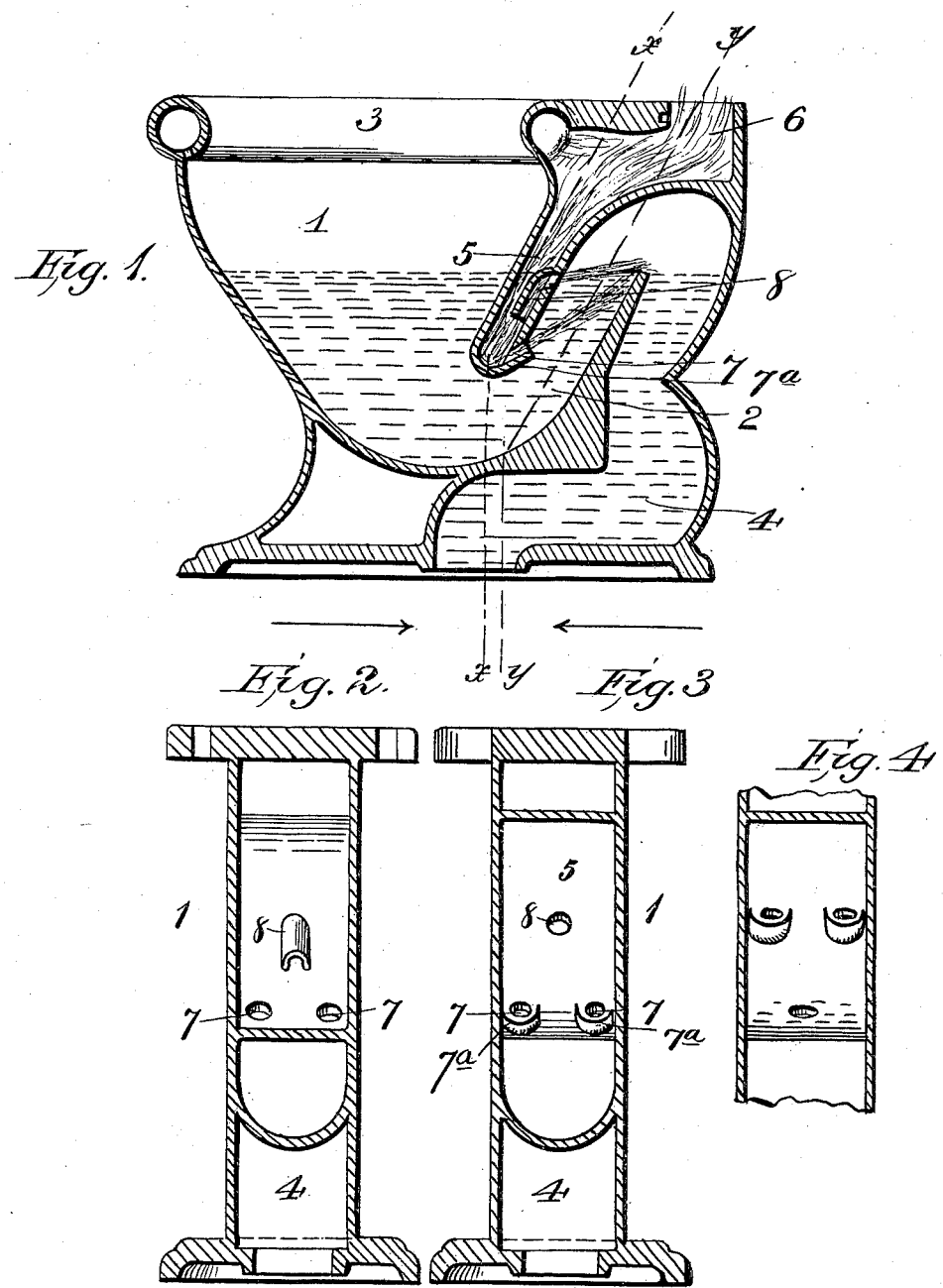

UNITED STATES PATENT OFFICE.

WILLIAM KULOW, OF KOKOMO, INDIANA, ASSIGNOR TO COLUMBIA POTTERY AND MANUFACTURING COMPANY, OF KOKOMO, INDIANA.

WATER-CLOSET.

SPECIFICATION forming part of Letters Patent No. 755,498, dated March 22, 1904.

Application filed September 18, 1903. Serial No. 173,685. (No model.)

*To all whom it may concern:*

Be it known that I, WILLIAM KULOW, a citizen of the United States, residing at Kokomo, in the county of Howard and State of Indiana, have invented new and useful Improvements in Water-Closets, of which the following is a specification.

My invention relates to improvements in water-closets, more especially of the siphonic-action type.

Said invention has for its object principally to dispense with all outside appendages, as jet and water-flushing pipes, by providing for the arrangement of means for that purpose within the bowl or basin itself, the advantages of which are numerous, among them the lessening of angles or corners, which would permit the lodgment of sediment or impurities, feces, &c., as experienced in the type of closets as heretofore constructed, whereby the bowl or basin is prevented from becoming clogged, consequently the obstructing of the jetting or flushing means, and whereby a successful and positive action or operation is thus assured under all circumstances. Also operating noises from the water jetting or flushing action are obviated, as is also the liability of the escape of sewer-gas above the water seal into the bowl or basin. Further, an increased siphonic action is herein secured to provide for effectually disposing of the bowl or basin contents.

Other salutary effects resulting from the use of my invention will be apparent later.

Said invention consists of certain features characterizing the bowl or basin and its adjunctive parts, substantially as hereinafter more fully disclosed, and specifically pointed out by the claims concluding the following description.

In the accompanying drawings, illustrating the preferred embodiment of my invention, Figure 1 is a sectional elevation thereof. Fig. 2 is a section taken on the line $x$ $x$ of Fig. 1, viewed in the direction of the arrow. Fig. 3 is a section taken on the line $y$ $y$ of Fig. 1, viewed in the direction of the second arrow. Fig. 4 is a modification of the same, which will be described in detail later.

In the carrying out of my invention I suitably cast or mold a basin or bowl 1, with its trap portion 2, including the rim-flushing passage or inlet 3 and the outlet or discharge member 4, all in a single entirety or casting, preferably as shown. Arranged intermediately of and being integral with the said bowl and said trap is a chamber or pocket 5, having its closed lower end or bottom arranged a suitable distance from the corresponding portion of said bowl or basin and forming with a continuation of said bowl-bottom one arm of the trap 2. The parts 2, 4, and 5, it will be observed, are all, in addition to being cast continuously in one with the bowl or basin, greatly contracted in cross-section, relatively, being produced in rectangular outlines in the minimum area, unlike anything of this kind heretofore known so far as my knowledge extends. Said pocket or chamber communicates at its upper end with the rim-flushing inlet or passage 3 and also with the flushing pipe or inlet 6, and thus provides for delivering the flushing-water from said inlet or tank pipe to said rim-passage and partly into itself, as shown. Said chamber or pocket has produced through its wall next to or facing the trap 2, near its lower end, horizontally-alining jet openings or apertures 7. A nozzle-like offset $7^a$ is cast or formed upon said pocket opposite each of said jet openings or apertures adapted as the water passes through said opening to direct said water upwardly diagonally across said trap, thus providing for the throwing or forcing by the action of the head of water through each opening a powerful stream or spray in a plane along and above the upper edge of the opposite wall of the latter, consequently producing a powerful and effective siphonic action for aiding the disposing of the bowl contents. Also through the same wall of said pocket or chamber 5, having said openings or apertures 7, is inserted one end of a jet pipe or nozzle 8, with said end arranged so as to permit of the throwing or forcing a single stream or spray therethrough to a common point or plane with that to which the sprays or streams form the apertures 7 are thrown, as shown, the several sprays thus combining to increase the siphonic action. Said jet pipe or nozzle 8 is adapted to have its inlet or receiving end submerged some distance below the water-line in the bowl, as is also the case with the opening 7, to exclude or overcome all "operating" noises which would otherwise be present from the action of the water jetting through said opening and pipe. It is also observed that by reason of such submergence of said jet nozzle or pipe and openings all possibility of the escape of sewer-gas is prevented, this being more effectually guarded against because of the greater water area of the seal thus obtained than by a more shallow water seal. Also all angles or corners are obviated where the same would afford lodgment for the contents of the bowl or basin, thus preventing the liability of the obstructing of the delivery pipe or trap from that cause.

As shown in Fig. 4, the arrangement of jet-openings and jet pipe or nozzle may be reversed and the effect or result remain unchanged.

I do not wish to be limited as to details of construction, as these may be modified in many particulars without departing from the spirit of my invention.

Having thus described my invention, what I claim as new, and desire to secure by Letters Patent, is—

1. A water-closet bowl or basin having arranged within itself a separate lower end-closed flushing chamber or pocket having, near its lower end, an upward and rearward inclined jet-nozzle and, a short distance above the latter, an additional correspondingly-inclined jet-nozzle, jointly delivering their water-jet into the upper part of the trap, said flushing-chamber and trap and the outlet member of said trap, all being rectangular and relatively contracted throughout in cross-section.

2. A water-closet bowl or basin having depending within itself a separate lower end-closing flushing-chamber, with said end removed some distance from the bottom of the bowl-chamber, said flushing-chamber forming one wall of one arm of the trap and having said wall provided with water-outlets, arranged near the bottom of said flushing-chamber and at a point farther upward, respectively, said water-outlets being inclined upward and rearward and delivering into the upper part of said trap.

In testimony whereof I have hereunto set my hand in presence of two subscribing witnesses.

WILLIAM KULOW.

Witnesses:
 HENRY C. WALDMANN,
 W. W. DRINKWATER.